United States Patent
Lo et al.

(10) Patent No.: US 10,710,579 B2
(45) Date of Patent: Jul. 14, 2020

(54) COLLISION PREDICTION SYSTEM

(71) Applicant: Waymo LLC, Mountain View, CA (US)

(72) Inventors: Wan-Yen Lo, Sunnyvale, CA (US); Abhijit Ogale, Sunnyvale, CA (US); David Ferguson, El Dorado Hills, CA (US)

(73) Assignee: Waymo LLC, Mountain View, CA (US)

( * ) Notice: Subject to any disclaimer, the term of this patent is extended or adjusted under 35 U.S.C. 154(b) by 104 days.

(21) Appl. No.: 15/611,397

(22) Filed: Jun. 1, 2017

(65) Prior Publication Data
US 2018/0345958 A1 Dec. 6, 2018

(51) Int. Cl.
| | |
|---|---|
| G06K 9/48 | (2006.01) |
| B60W 30/09 | (2012.01) |
| G05D 1/00 | (2006.01) |
| B60W 50/00 | (2006.01) |
| B60W 50/14 | (2020.01) |
| G08G 1/0967 | (2006.01) |
| G08G 1/16 | (2006.01) |
| G05D 1/02 | (2020.01) |

(52) U.S. Cl.
CPC ........ *B60W 30/09* (2013.01); *B60W 50/0097* (2013.01); *B60W 50/14* (2013.01); *G05D 1/0088* (2013.01); *G08G 1/096725* (2013.01); *G08G 1/165* (2013.01); *G08G 1/166* (2013.01); *G05D 1/024* (2013.01)

(58) Field of Classification Search
CPC ........................... G06K 9/00805; G01S 13/04
See application file for complete search history.

(56) References Cited

U.S. PATENT DOCUMENTS

| | | | |
|---|---|---|---|
| 5,610,815 A | 3/1997 | Gudat et al. | |
| 5,612,883 A | 3/1997 | Shaffer et al. | |
| 6,405,132 B1 | 6/2002 | Breed et al. | |
| 6,535,114 B1 * | 3/2003 | Suzuki | G06T 7/20 340/435 |
| 6,680,689 B1 * | 1/2004 | Zoratti | B60Q 9/008 342/70 |
| 8,000,897 B2 | 8/2011 | Breed et al. | |

(Continued)

OTHER PUBLICATIONS

Doucet et al. "A tutorial on particle filtering and smoothing. Fifteen years later," Handbook of Nonlinear Filtering 12, 2008, 39 pages.

(Continued)

*Primary Examiner* — Jess Whittington
(74) *Attorney, Agent, or Firm* — Fish & Richardson P.C.

(57) ABSTRACT

In some implementations, an autonomous or semi-autonomous vehicle is capable of using a collision prediction system to determine a confidence that any objects detected within a vicinity of the vehicle are on a trajectory that will collide with the vehicle. Laser obstacle points derived from recent sensor readings of one or more sensors of a vehicle are initially obtained. The laser obstacle points are projected into a pose coordinate system to generate an occupancy grid of a vicinity of the vehicle. A confidence that any objects represented by the laser obstacle points are on a trajectory that will collide with the vehicle is determined by applying a particle filter to the occupancy grid.

16 Claims, 7 Drawing Sheets

(56) References Cited

U.S. PATENT DOCUMENTS

| | | | |
|---|---|---|---|
| 9,576,185 B1* | 2/2017 | Delp | G06K 9/00201 |
| 2007/0046450 A1* | 3/2007 | Iwama | G01S 11/12 |
| | | | 340/436 |
| 2009/0033745 A1* | 2/2009 | Yeredor | G01S 3/7864 |
| | | | 348/152 |
| 2010/0104199 A1* | 4/2010 | Zhang | G06K 9/00798 |
| | | | 382/199 |
| 2010/0202657 A1* | 8/2010 | Salgian | G06K 9/00369 |
| | | | 382/103 |
| 2010/0305857 A1 | 12/2010 | Byrne et al. | |
| 2011/0187863 A1* | 8/2011 | Glander | G01S 17/86 |
| | | | 348/148 |
| 2012/0269382 A1* | 10/2012 | Kiyohara | G01C 21/26 |
| | | | 382/103 |
| 2013/0031045 A1* | 1/2013 | James | G06N 7/005 |
| | | | 706/52 |
| 2013/0293395 A1* | 11/2013 | Ohama | G08G 1/16 |
| | | | 340/904 |
| 2014/0002647 A1* | 1/2014 | Xu | G06K 9/6284 |
| | | | 348/143 |
| 2014/0292554 A1* | 10/2014 | Smith | G01S 13/04 |
| | | | 342/27 |
| 2016/0109571 A1 | 4/2016 | Zeng et al. | |

OTHER PUBLICATIONS

PCT International Search Report issued in International Application No. PCT/US2018/035418, dated Sep. 11, 2018, 15 pages.

Yu. "Vehicle Perception: Localization, Mapping with Detection, Classification and Tracking of Moving Objects," Computer Science, Sep. 18, 2009, 127 pages.

PCT International Preliminary Report on Patentability in International Application No. PCT/US2018/035418, dated Dec. 3, 2019, 9 pages.

* cited by examiner

COLLISION PREDICTION SYSTEM

FIELD

This specification relates to autonomous vehicles.

BACKGROUND

Autonomous vehicles include self-driving cars, boats, and aircraft. Autonomous vehicles use a variety of on-board sensors and computer systems to detect nearby objects and use such detections to make control and navigation decisions. Some autonomous vehicles have computer systems that use object detection predictions for making driving decisions. Autonomous vehicle systems can make object detection predictions using human-programmed logic. The human-programmed logic specifies precisely how the outputs of on-board sensors should be combined, transformed, and weighted, in order to make a prediction.

SUMMARY

In some implementations, an autonomous or semi-autonomous vehicle is capable of using a collision prediction system to determine a confidence that any objects detected within a vicinity of the vehicle are on a trajectory that will collide with the vehicle. The system projects recently-detected laser obstacle points collected from an environment surrounding the vehicle into a pose coordinate system to generate a space-time occupancy grid. The system identifies object clusters in the space-time occupancy grid that are within the vicinity of the vehicle. The system then uses a particle filtering technique to predict the motion of the object clusters that are identified within the space-time occupancy grid. The system uses the trajectories of the predicted motion of the object clusters to compute a confidence indicating a likelihood of a future vehicle collision. The output of the system can be used to predict a likelihood that any of the objects represented by the object clusters will collide with the vehicle.

Particular embodiments of the subject matter described in this specification can be implemented so as to realize one or more of the following advantages. An autonomous or semi-autonomous vehicle system can use the collision prediction subsystem to determine a high likelihood of a collision taking place, and in response, automatically perform a specified action to prevent the collision before it takes place. For example, in response to determining a high confidence that a collision will take place, the autonomous or semi-autonomous vehicle system can automatically apply vehicle brakes to prevent the collision. In another example, the system provides a notification or alert indicating the potential collision to a user that is driving the vehicle.

In addition, the system can apply the collision prediction subsystem as a backup collision detection system when other primary collision detection systems have been unable to sufficiently predict future behavior to predict that a collision is likely to take place. The collision prediction subsystem can be used to compute a high-precision prediction that does not rely on the assumptions of the primary collision detection systems. For example, the collision prediction subsystem may be used to predict motion of objects to determine a high likelihood of a collision with an object regardless of the classification of the object.

In one general aspect, a method includes the operations of: obtaining laser obstacle points derived from recent sensor readings of one or more sensors of a vehicle; projecting the laser obstacle points into a pose coordinate system to generate an occupancy grid of a vicinity of the vehicle; and determining, by applying a particle filter to the occupancy grid, a confidence that any objects represented by the laser obstacle points are on a trajectory that will collide with the vehicle.

One or more implementations may include the following optional features. For example, in some implementations, the method further includes the operation of: when the confidence exceeds a threshold confidence, providing a collision alert to a control system for the vehicle.

In some implementations, the sensor readings are collected over a particular time period; and the occupancy grid includes a plurality of frames that each correspond to a different time point within the particular time period.

In some implementations, the method further includes the operation of clustering the laser obstacle points into one or more object clusters within the vicinity of the vehicle in the occupancy grid. In such implementations, for each of the one or more object clusters, the method includes the operations of: determining a respective coordinate location of the object cluster within each of the plurality of frames of the occupancy grid; and determining a respective cluster trajectory based on the determined respective locations of the object cluster within each of the plurality of frames of the occupancy grid.

In some implementations, the method further includes the operation of determining a plurality of particles that are included in each of the one or more object clusters. In such implementations, for each of the plurality of particles, the method further includes the operations of: determining a location of the particle within each of the plurality of frames of the occupancy grid; determining a particle trajectory based on the determined locations of the particle within each of the plurality of frames of the occupancy grid; and assigning a weight to the particle based on a correspondence between the particle trajectory and a cluster trajectory of an object cluster that includes the particle.

In some implementations, the method includes, for each of the one or more object clusters, the operations of: combining the particle trajectories using the respective weights assigned to the particles included in the object cluster to generate a combined particle trajectory; and generating an adjusted cluster trajectory using the combined particle trajectory.

In some implementations, determining the confidence that any objects represented by the laser obstacle points are on a trajectory that will collide with the vehicle includes computing respective object collision scores for the one or more object clusters based on the adjusted cluster trajectory.

In some implementations, clustering the laser obstacle points into one or more object clusters includes the operations of: clustering the laser obstacle points into one or more candidate object clusters; and discarding any candidate object clusters having a size that does not satisfy predetermined size criteria.

In some implementations, the method includes the operations of: determining a plurality of particles that are within the vicinity of the vehicle in the occupancy grid. In such implementations, for each of the plurality of particles, the method includes the operations of: determining a location of the particle within each of the plurality of frames of the occupancy grid; determining a particle trajectory based on the determined locations of the particle within each of the plurality of frames of the occupancy grid; and assigning a weight to the particle based on a correspondence between the particle trajectory and a cluster trajectory of an object cluster that includes the particle.

In some implementations, for each of the one or more object clusters, the method includes the operations of: combining the particle trajectories using the respective weights assigned to the particles included in the object cluster to generate one or more combined particle trajectories.

In some implementations, determining the confidence that any objects represented by the laser obstacle points are on a trajectory that will collide with the vehicle includes computing respective particle collision scores for the plurality of particles.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a collision prediction system to determine a confidence that any objects detected within a vicinity of the vehicle are on a trajectory that will collide with the vehicle. The system determines the confidence based on predicting motion of objects identified within a vicinity of the vehicle and determining if objects will collide with the vehicle based on the predicted motion of the objects. The output of the system can be used to perform actions to prevent the collision or reduce the impact of the collision on the vehicle. For example, in response to determining a high confidence that a collision with an object will take place, a planning subsystem of the vehicle can automatically apply the vehicle's breaks or otherwise automatically change the vehicle's trajectory to prevent the collision between the object and the vehicle. In other examples, a user interface subsystem presents an alert message to a driver of the vehicle with instructions to adjust the trajectory of the vehicle or apply vehicle brakes prior to collision.

Figure 1:
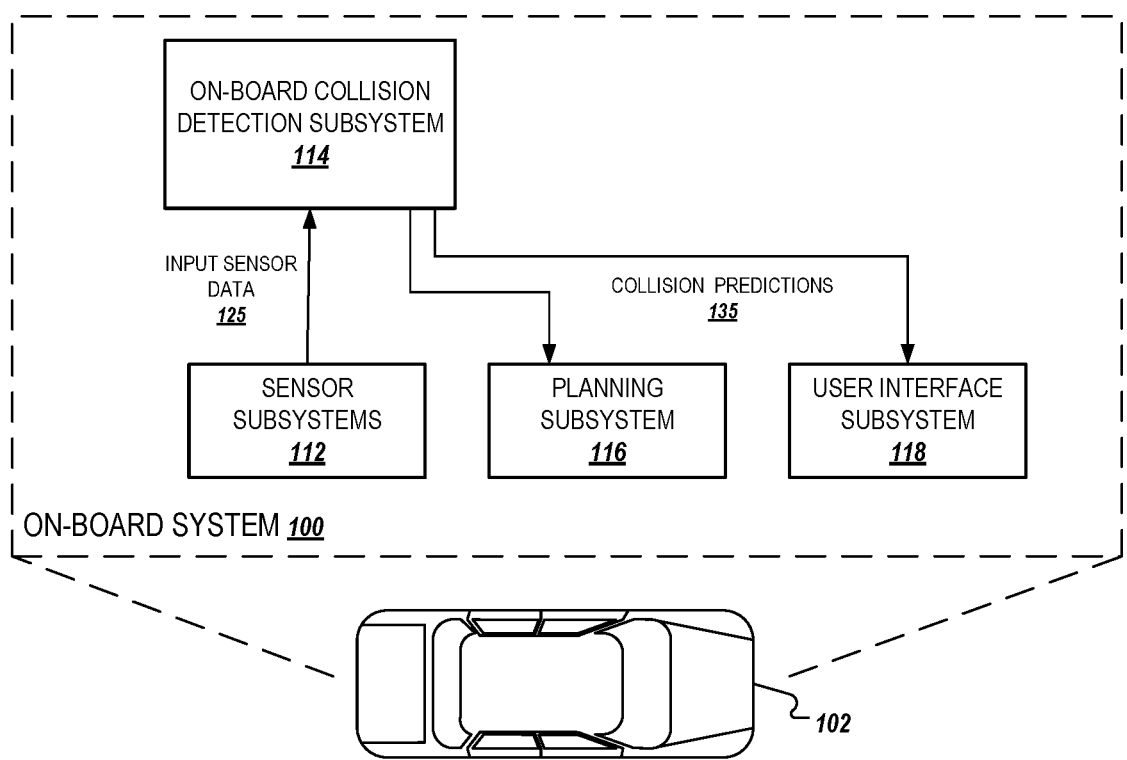
FIG. 1 is a block diagram of an example of a system.

FIG. 1 is a diagram of an example of an on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that uses object detection predictions to inform fully-autonomous driving decisions. The vehicle 102 can also be a semi-autonomous vehicle that uses object detection predictions to aid a human driver. For example, the vehicle 102 can autonomously apply the brakes if a prediction indicates that a human driver is about to collide with a detected object, e.g., a pedestrian, a cyclist, another vehicle.

The on-board system 100 includes one or more sensor subsystems 112. The sensor subsystems include a combination of components that receive reflections of electromagnetic radiation, e.g., LIDAR systems that detect reflections of laser light, radar systems that detect reflections of radio waves, and camera systems that detect reflections of visible light.

The sensor subsystems can also include combinations of short-range and long-range laser sensors. For example, a short-range laser sensor can be used to detect the ground surrounding vehicle 102 and nearby objects within 40 meters from the vehicle 102. In another example, a long-range laser sensor can be used to detect objects up to 80 meters around the vehicle 102.

The raw input sensor data indicates a distance, a direction, and an intensity of reflected radiation. Each sensor can transmit one or more pulses of electromagnetic radiation in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 112 provide input sensor data 125 to an on-board collision detection subsystem 114. The input sensor data 125 can include multiple channels of data, where each channel represents a different characteristic of reflected electromagnetic radiation. Thus, multiple channels of input sensor data 125 can be generated from measurements from the same sensor.

The sensor subsystems 112, the on-board collision detection subsystem 114, or some combination of both, transform raw sensor data into the multiple channels of input sensor data 125. To do so, the on-board system 100 can project the various characteristics of the raw sensor data into a common coordinate system. The various characteristics of the raw sensor data, and their respective representations, will be discussed in more detail below with reference to FIG. 4.

Figure 3:
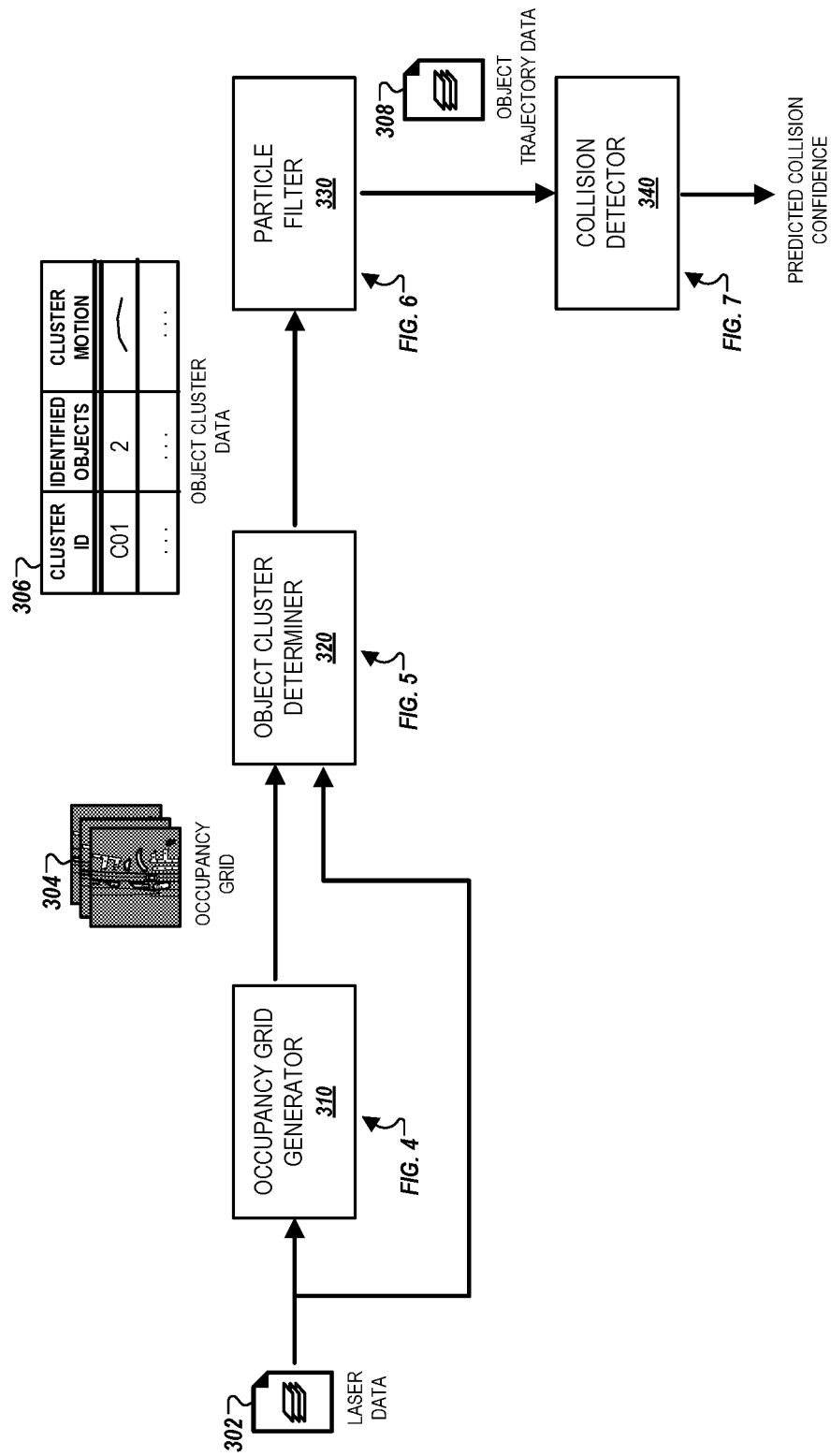
FIG. 3 is a schematic diagram of an example of an architecture of a collision prediction system.

The on-board collision detection subsystem 114 includes components that identify objects within a vicinity of the vehicle, analyze motion of the identified objects within recently collected sensor data to predict subsequent motion of the identified objects, and determines if the predicted motion will cause a collision with the vehicle. For example, the on-board collision detection subsystem 114 includes an occupancy grid generator 310, an object cluster determiner 320, a particle filter 330, and a collision detector 340, which are depicted in FIG. 3. Operations performed by these components are depicted in FIGS. 4-7 and described in detail below.

The on-board collision detection subsystem 114 uses the input sensor data 125 to generate one or more collision predictions 135. The on-board collision detection subsystem 114 can provide the one or more collision predictions 135 to a planning subsystem 116, a user interface subsystem 118, or both. As described below, the collision predictions 135 include a confidence representing a likelihood that an object will collide with the vehicle at some future time point based on its predicted motion relative to the predicted motion of the vehicle. In some implementations, the collision predictions 135 includes multiple confidences corresponding to multiple objects that are identified to be in a vicinity of the vehicle.

When a planning subsystem 116 receives the one or more collision predictions 135, the planning subsystem 116 can use the one or more collision predictions 135 to make fully-autonomous or semi-autonomous driving decisions. For example, the planning subsystem 116 can generate a fully-autonomous plan to navigate the vehicle to avoid the trajectory of predicted motion for an object that is identified within the collision predictions 135 to have a high confidence of colliding with the vehicle, i.e., by applying the vehicle's breaks or otherwise changing the future trajectory of the vehicle. As another example, the planning subsystem 116 can generate a semi-autonomous recommendation for a human driver to apply the manually brakes to avoid the object.

A user interface subsystem 118 can receive the collision predictions 135 and can generate a user interface presentation that indicates the locations of nearby objects and/or notifications associated with predicted collisions. For example, the user interface subsystem 118 can generate a user interface presentation that alerts a driver of the vehicle that a collision may be incoming and, optionally, encourages the driver to apply the vehicle brakes. An on-board display device can then display the user interface presentation for passengers of the vehicle 102.

Figure 2:
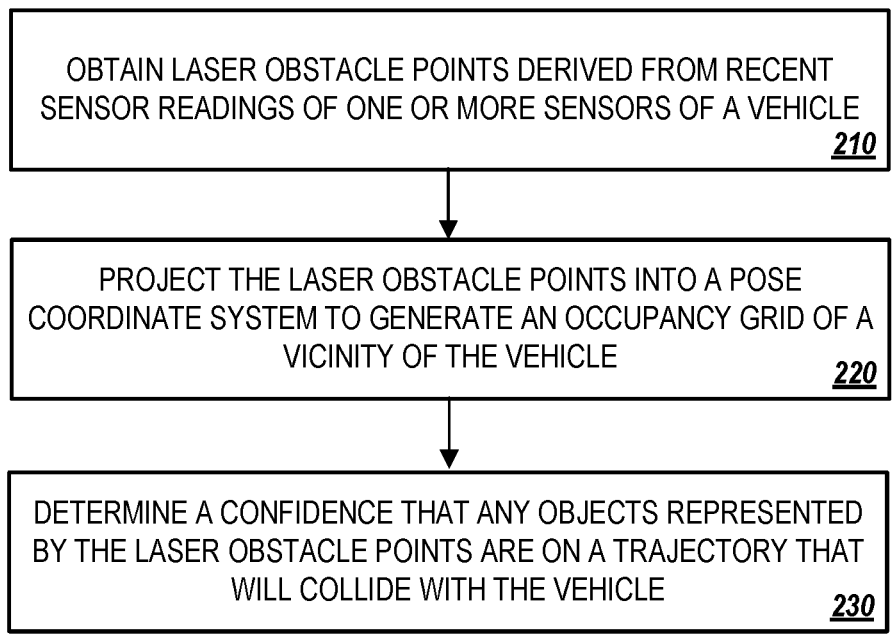
FIG. 2 is a flow chart of an example of a process for predicting potential collisions with objects detected in the vicinity of an autonomous vehicle.

FIG. 2 is a flow chart of an example of a process 200 for predicting potential collisions with objects detected in proximity of an autonomous vehicle. For convenience, the process 200 will be described as being performed by a system of one or more computers located in one or more locations. For example, a collision prediction system, e.g., the on-board system 100 of FIG. 1, appropriately programmed in accordance with this specification, can perform the process 200.

In general, the system performs the collision prediction techniques described throughout using an architecture depicted in detail in FIG. 3, which is a schematic diagram of an example of an architecture 300A that includes the occupancy grid generator 310, the object cluster determiner 320, the particle filter 330, and the collision detector 340. The system computes one or more collision prediction confidences based on analyzing recent sensor readings of the vehicle to predict motion of detected objects, as described in detail below.

Briefly, the process 200 can include obtaining laser obstacle points derived from recent sensor readings of one or more sensors of a vehicle (210), projecting the laser obstacle points into a pose coordinate system to generate an occupancy grid of the vicinity of the vehicle (220), and determining a confidence that any objects represented by the laser obstacle points are on a trajectory that will collide with the vehicle (230).

In more detail, the system obtains laser obstacle points derived from recent sensor readings of one or more sensors of a vehicle (210). The laser obstacle points are derived from a three-dimensional laser reading collected by a short-range laser sensor included within the sensor subsystems 122. The short-range laser sensor captures laser data from short-range regions (e.g., less than 40 meters) from the vehicle. The system periodically samples recently collected laser data (e.g., laser data collected in the last two seconds). In this regard, the laser obstacle points identify regions within the environment surrounding the vehicle where an object may be located.

Figure 4:
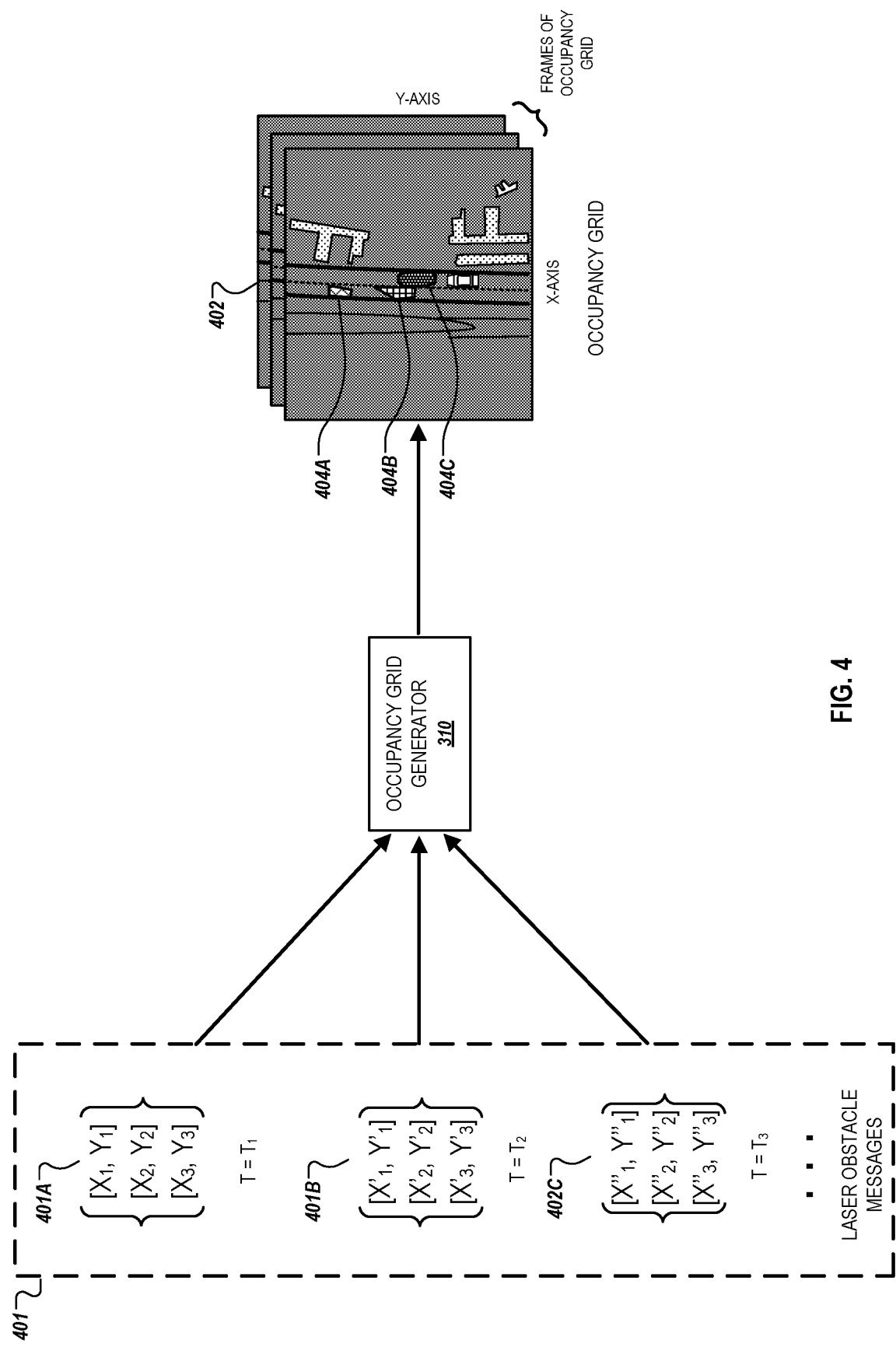
FIG. 4 is a schematic diagram of an example of a process for generating a space-time occupancy grid from laser obstacle messages.

The system projects the laser obstacle points into a pose coordinate system to generate an occupancy grid of the vicinity of the vehicle (220). As depicted in FIG. 4, the occupancy grid generator 310 projects information associated with the laser obstacle points into a pose coordinate system. The occupancy grid generator 310 uses this information to generate an occupancy grid 402, which represents the position and orientation of each laser obstacle point relative to a coordinate system representing the spatial environment of the vehicle.

The occupancy grid 402 is a three-dimensional space-time occupancy grid that enables visualization of movement with respect to two spatial axes (e.g., x-axis and y-axis) and with respect to time within a two-dimensional projected image. For example, as depicted in FIG. 4, the occupancy grid 402 can represent the time axis using multiple frames that each correspond to a discrete time point within a period of time during which the laser data is collected. As an example, the occupancy grid 402 can include 12 frames for laser data collected over a two-second time period. In this example, each frame can represent spatial information for laser obstacle points at a discrete time point over the two second time period, i.e., each subsequent frame is associated with a time point that is incremented by 20 ms relative to the time point of a prior frame. As discussed in detail below, the system tracks the changes in coordinate locations of laser obstacle points between frames of the occupancy grid 402 to identify motion of corresponding objects over the time period during which the laser data is collected.

In some implementations, spatial information represented in each of individual frames of the occupancy grid 402 can be combined to generate a single two-dimensional image that represents movement of an object between multiple frames. For example, multiple frames of the occupancy grid 402 can be superimposed such that movement of an object between multiple frames can be represented as displacement along two-dimensional axes, i.e., movement along the x and y-axis between individual frames. In this example, different pixel intensity values can be assigned to object locations obtained from multiple frames to represent movement over the time axis within a single image to identify a trajectory of motion within a two-dimensional coordinate system.

In some implementations, spatial information can be represented within the occupancy grid 402 to indicate the location of laser obstacle points at discrete time points within a time period associated with the occupancy grid 402. In such implementations, pixel values of pixels occupied by laser obstacle points within the occupancy grid 402 can be associated with bit values that identify the particular frame in which the laser obstacle point is detected to occupy within multiple frames of the occupancy grid. Because each frame is associated with a time point, the bit values can therefore be used to identify locations of a laser obstacle point within the occupancy grid 402. In some implementations, the number of bit values associated with a laser obstacle point can be used to increase the pixel value of a pixel associated with the laser obstacle point such that laser obstacle points that are present in a greater number of frames have larger pixel values than laser obstacle points that are present a smaller number of frames.

The system determines a confidence that any objects represented by the laser obstacle points are on a trajectory that will collide with the vehicle (230). As described in FIGS. 5-7, the system uses a particle filtering technique that uses historical motion of objects, based on tracking coordinate locations of corresponding laser obstacle points between frames of the occupancy grid 402, to predict a trajectory of motion.

The predicted trajectory identifies coordinate locations where an object is likely to travel at some later time point based on its historical motion within the space-time occupancy grid 402. In some implementations, the system also predicts a trajectory for the vehicle based on its detected movement. In such implementations, the system uses the predicted trajectories of the objects to determine if any of the objects are on a predicted trajectory that is likely to collide with the predicted trajectory of the vehicle. The system determines a confidence that reflects this likelihood, which can then be used to perform actions to avoid and/or minimize the impact of any resulting collision.

FIG. 3 is a schematic diagram of an example of an architecture for a collision prediction system 300. The system 300 includes an occupancy grid generator 310, an object cluster determiner 320, and a particle filter 300. The components of the system 300 can generally be represented as software modules that are implemented within the on-board collision detection system 114 as described above and depicted in FIG. 1. The components can be implemented on a single hardware module of the on-board collision detection system 114, or alternatively, on separate hardware modules of the on-board collision detection system 114.

During an exemplary collision prediction operation for a vehicle, the occupancy grid generator 310 obtains laser data 302 collected by short-range laser sensors included within the sensor subsystems 112 of the vehicle. The occupancy grid generator 310 identifies laser obstacle points included within the laser data 302 and projects them into a pose coordinate system to generate the occupancy grid 304. The generation of the occupancy grid 304 is depicted in detail in FIG. 4.

The object cluster determiner 330 clusters the laser obstacle points within the occupancy grid 304 into one or more object clusters that each include one or more corresponding objects to generate object cluster data 306. As depicted in FIG. 3, for each identified object cluster, the object cluster data 306 can specify a cluster identifier, a number of objects included within the object cluster, and motion detected for the object cluster. The generation of the object cluster data 306 is depicted in detail in FIG. 5.

The particle filter 330 determines a trajectory of predicted motion for each object cluster, which is included in object cluster trajectory data 308. The trajectory of predicted motion identifies a location that an object corresponding to an object cluster is likely to travel to at some future time point if it continues to move along a trajectory of detected motion. The trajectory of detected motion is determined based on tracking the movement of the object cluster between multiple frames of the occupancy grid 304, i.e., by identifying changes in coordinate locations of the object cluster between multiple frames. Tracked motion during a time period associated with the occupancy grid 304 is then used to predict coordinate locations where an object cluster is likely to travel at a time point after the time period associated with the occupancy grid 304. The determination of a trajectory of predicted motion for an exemplary object cluster is depicted in detail in FIG. 6.

The collision detector 340 determines whether the predicted trajectories of object clusters included within the object trajectory data 308 will collide with the vehicle at a future time point. The collision detector 340 computes one or more confidence scores representing probabilities that any objects are on a trajectory that will collide with the vehicle. The prediction of a collision between a vehicle and an on object within a vicinity of the vehicle is depicted in detail in FIG. 7.

Figure 5:
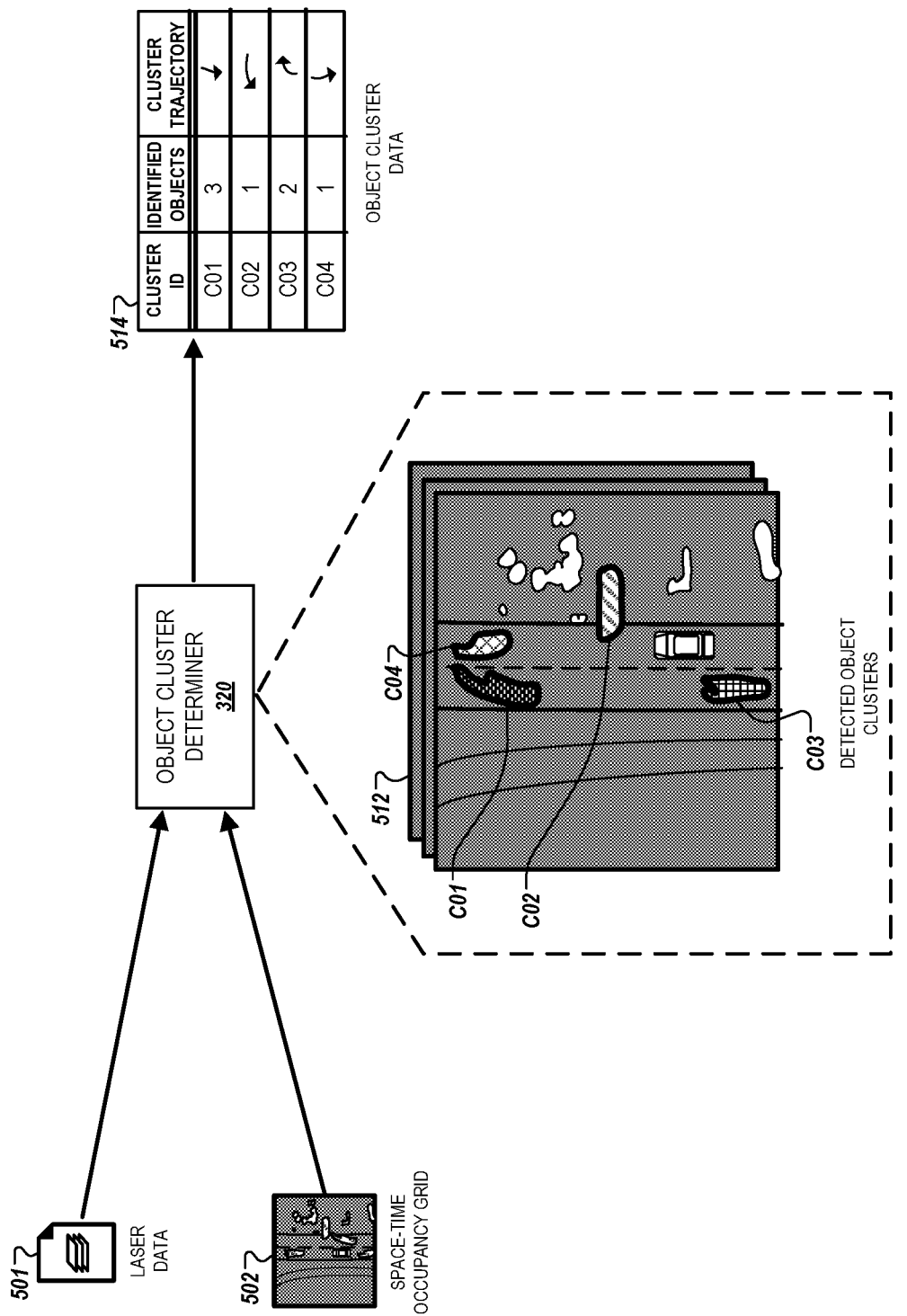
FIG. 5 is a schematic diagram of an example of a process for isolating objects detected in the vicinity of a vehicle.

In some implementations, the system does not cluster laser obstacle points into object clusters depicted in FIGS. 3 and 5 and described throughout. In such implementations, the system transmits the output of the occupancy generator 310 to the particle filter 330 without using the object cluster determiner 320. For example, the particle filter 330 initially obtains the occupancy grid 304 and determines motion of particles associated with to laser obstacle points. The particle motion within the occupancy grid 304 is then used to determine trajectories of predicted motion in a similar manner as described with respect to FIG. 6. The collision detector 340 uses the predicted particle trajectories to determine the predicted collision confidence in a similar manner as described with respect to FIG. 7.

Referring now to FIG. 4, an example of a process for generating the occupancy grid 304 is depicted. The occupancy grid generator 310 initially obtains laser data 301 collected over a specified time period prior to when the occupancy grid generator 310 obtains the laser data 301 (e.g., two seconds). The laser data 301 can include laser sensor readings of an environment surrounding a vehicle. The laser data 301 also includes multiple laser obstacle messages that identify locations within an environment surrounding the vehicle that are likely to be occupied by one or more objects.

In the example depicted, the laser data 401 includes at least three laser obstacle messages 401A, 401B, and 401C that are collected at different time points from a three-dimensional laser sensor reading of an environment surrounding a vehicle. Each of the laser obstacle messages 401A, 401B, and 401C identify locations of three laser obstacle points at a discrete time point. For example, the laser obstacle message 401A identifies locations of laser obstacle points at time point $T_1$, the laser obstacle message 401B identifies locations of laser obstacle points at time point $T_2$, and the laser obstacle message 401C identifies locations of laser obstacle points at time point $T_3$. In this example, time point $T_1$ occurs before time point $T_2$, which occurs before time point $T_3$.

The occupancy grid generator 310 projects the laser obstacle points into a pose coordinate system to generate the occupancy grid 402. The occupancy grid 402 can be generated by projecting the coordinates specified within laser obstacle messages 401A, 401B, and 401C onto a common coordinate system that represents a top-down view of the vehicle's surrounding environment. For example, the occupancy grid generator 310 computes a transformation between global coordinates indicated within the laser obstacle messages 401A, 401B, and 401C and a pose coordinate system of the occupancy grid 402. In this example, the occupancy grid generator 310 applies the transformation to the global coordinates of each laser obstacle point to determine a corresponding pose coordinate location within the occupancy grid 402. As shown, the occupancy grid 402 represents a plane that is substantially parallel to the road on which the vehicle is travelling. The vehicle recording the input data is thus located substantially in the middle of the image.

In the example depicted in FIG. 4, the occupancy grid 402 identifies coordinate locations of three laser obstacle points 404A, 404B, and 404C that are projected onto a coordinate system based on the locations identified within the laser obstacle messages 401A, 401B, and 401C. The occupancy grid 402 also includes at least three frames that represent the locations of laser obstacle points at corresponding time periods associated with each laser obstacle message. For example, a first frame of the occupancy grid 402 projects locations of laser obstacle points indicated by the laser obstacle message 401A, a second frame projects locations of laser obstacle points indicated by the laser obstacle message 401B, and a third frame projects locations of laser obstacle points indicated by the laser obstacle message 401C. In this example, the first frame is associated with time point $T_1$, the second frame is associated with time point $T_2$, and the third frame is associated with time point $T_3$.

As discussed below, the occupancy grid 402 can be used as a three-dimensional space-time representation of laser obstacle points over a specified time period, which can then be used to identify movement of objects corresponding to the laser obstacle points. Spatial positions of the laser obstacle points within the occupancy grid 402 are represented along two spatial axes (e.g., x-axis and y-axis), and movement over the specified time period can determined based on changes in the coordinate locations of a particular laser obstacle point between consecutive frames of the occupancy grid 402. The occupancy grid generator 310 can adjust the number of frames that are included within the occupancy grid based on adjusting the sampling rate of sensor data 401 that is collected over the specified time period.

Referring to FIG. 5, an example of a process for isolating objects detected in the vicinity of a vehicle is depicted. The object cluster determiner 320 obtains laser data 501 collected over a specified time period and an occupancy grid 502 generated by the occupancy grid generator 310 based on the laser obstacle messages included within the laser data 501. The object cluster determiner 320 generates object clusters based on identifying laser obstacle points that are closely located near each another within the initial frame of the occupancy grid 512 and labels these points as being part of the same object cluster. The object cluster determiner 320 clusters the laser obstacle points such that each object cluster that is predicted to represent at least one discrete object. The object clusters can be formed in a manner that favors under-segmentation over over-segmentation, i.e., generating a smaller number of larger object clusters as opposed to a larger number of smaller object clusters. In this regard, a single object cluster can represent multiple objects that are positioned close to one another. Additionally, object clusters can be identified irrespective of object classification and in instances where the sensor subsystems 112 of the vehicle fail to accurately perceive an object as a moving object.

The object cluster determiner 320 can use a variety of cluster analysis techniques to generate the object clusters. For example, the object cluster determiner 320 can use a flooding technique that initially selects unoccupied pixels, e.g., pixels that are determined to not be occupied by a laser obstacle point, and/or unclustered pixels, e.g., pixels that are not associated with an object cluster, and identifies the largest object cluster near their vicinity within the occupancy grid 402. For example, an unclustered laser obstacle point that is detected to be nearby an existing object cluster can be clustered to be included in the existing object cluster. In some implementations, the object cluster determiner 320 can use machine learning, pattern recognition, image analysis, information retrieval, and graphical analysis to identify and generate object clusters. For example, the object cluster determiner 320 may determine that two nearby detected objects that are associated with similar image attributes should be included within a single object cluster based on their image attributes satisfying a threshold similarity metric.

The object cluster determiner 320 also tracks the movement of each object cluster over a specified time period during which the laser data 501 is collected. To accomplish this, the object cluster determiner 320 labels the location of each identified object cluster within a first frame of the occupancy grid 502. The object cluster determiner 320 compares the labelled locations of the first frame to corresponding locations of the second frame identify regions of the second frame that include overlapping object clusters. This process is repeated to identify respective cluster locations of each object cluster within multiple frames of the occupancy grid 502.

In the example depicted in FIG. 5, the object cluster determiner 320 identifies and isolates four object clusters C01-04 in the occupancy grid 512. In this example, the object cluster C02 can represent a vehicle that is exiting out of a driveway and is not perceived by the sensor subsystem 112 to represent a dynamic object. The object cluster determiner 320, however, identifies this object cluster regardless of object classification using the techniques described above. The object cluster determiner 320 then generates object cluster data 514, which specifies tracked information for each of the identified object clusters C01-04. As shown, the object cluster data 514 specifies a cluster identifier, a predicted number of identified objects within the object cluster, i.e., based on a determined size of the object clusters, and a cluster trajectory. The cluster trajectory is represented as a series of coordinate locations that are identified for an object cluster within each frame of the occupancy grid 512. As an example, the cluster trajectory for an object cluster over three frames would be represented as a series of coordinate locations that are identified for the object cluster within each individual frame (e.g., $[X_1, Y_1]$, $[X_2, Y_2]$, $[X_3, Y_3]$).

In some implementations, the object cluster determiner 320 is capable of distinguishing between object clusters identified for dynamic objects, i.e., moving objects, and object clusters identified for stationary objects, e.g., stop signs, buildings. The object cluster determiner 320 may use a set of predetermined cluster criteria to differentiate between different types of candidate object clusters and filter out candidate object clusters that are unlikely to represent dynamic objects. For example, the object cluster determiner 320 may determine the size of each candidate object cluster and then filter out object clusters that fail to satisfy a minimum threshold cluster size. In this example, the object clusters that are filtered out can represent outliers or small static objects. In another example, the object cluster determiner 320 may filter out object clusters that have cluster size that exceeds a maximum threshold cluster size. In this example, the object clusters that are filtered out can represent statistic obstacles like road medians. In other examples, other types of size-independent criteria can be used, i.e., cluster shape, cluster location, etc. In these examples, the object cluster determiner 320 may generate object cluster data 514 only for those object clusters that satisfy the object cluster criteria, thereby reducing the computational requirements associated with object clustering.

Figure 6:
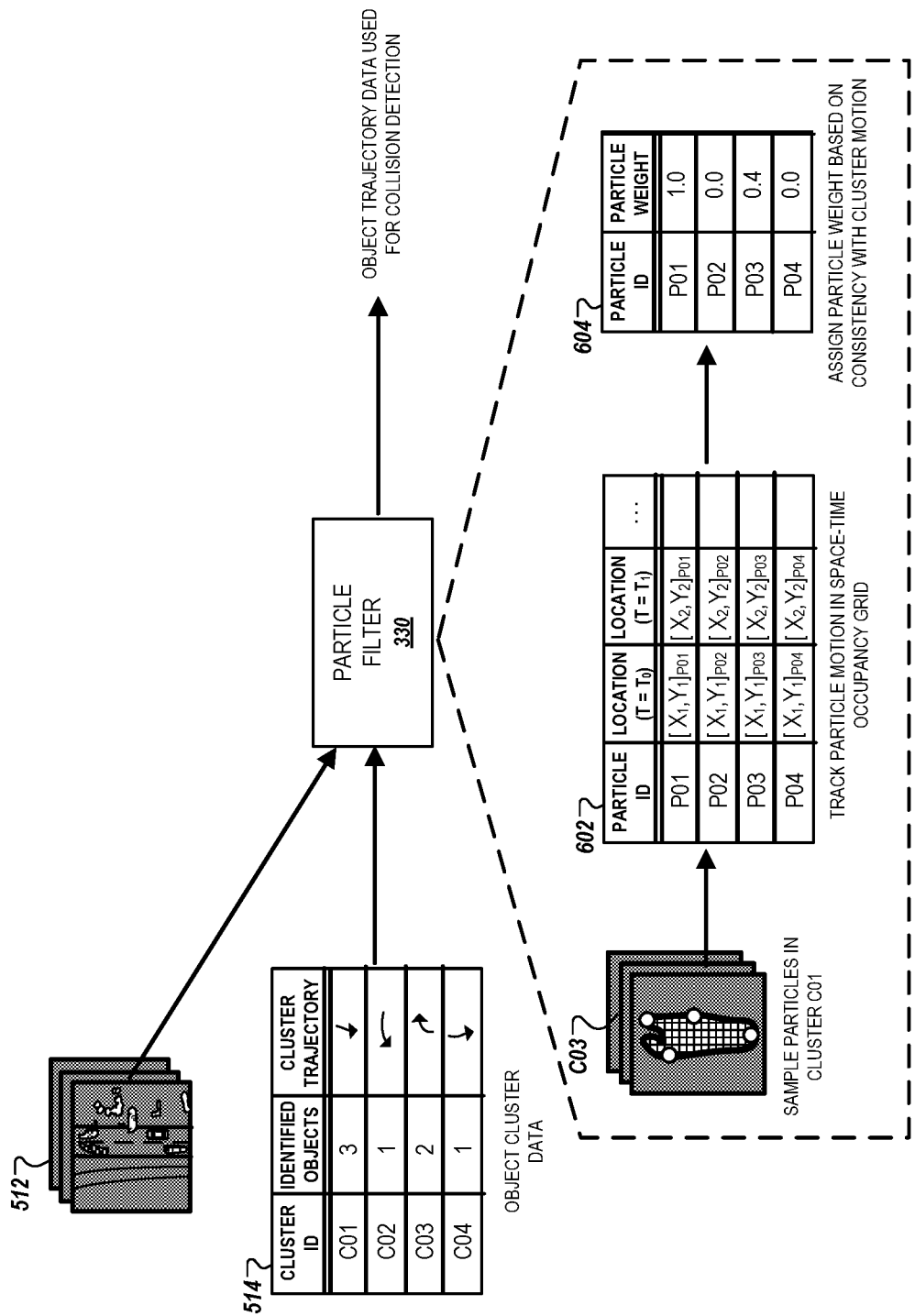
FIG. 6 is a schematic diagram of an example of a process for predicting motion of an object cluster identified in FIG. 5.

Referring to FIG. 6, an example of a process for predicting motion of object clusters is depicted. The particle filter 330 initially obtains an occupancy grid 512 generated by the occupancy grid generator 310, and object cluster data 514 generated by the object cluster determiner 320. The particle filter 330 samples a set of particles for each object cluster that is identified within the object cluster data 514 to analyze motion within each object cluster. Although FIG. 6 depicts the particle filtering technique with a single object cluster C04, the particle filter 330 performs substantially the same operations for all other object clusters that are identified within the object cluster data 514.

In general, the particle filter 330 uses a particle filtering technique to enable the system to determine if motion of individual particles that are sampled from within an object cluster within the occupancy grid 512 is consistent with motion attributable to the entire object cluster within the occupancy grid 512. This is accomplished by initially selecting a set of particles that occupy an object cluster. The number of particles that are selected can be based on multiple factors, i.e., a cluster size of each object cluster. For example, the particle cluster 330 may select a larger number of particles to analyze for a large object cluster and select a smaller number of particles to analyze for a small object cluster.

The particle filter 330 determines motion of each individual particle by tracking their respective locations within consecutive frames of the occupancy grid 512. The detected motion can be updated with a Gaussian distribution of fixed standard deviation to determine how much motion change can occur between consecutive frames of the occupancy grid 512. For example, when individual particles are first sampled, they are initially assigned random motion (e.g., heading direction, speed). After a first simulation is conducted for consecutive frames, the particle filter 330 computes weights of individual particles and resamples the particles according to the computed weights. The motion of each individual particle determined at each following consecutive frame can be determined based on adjusting the motion detected at a prior frame using a standard deviation that reflects the change in motion between consecutive frames. As an example, the measured speed of an individual particle can be measured using equation (1):

$$S' = S + \sigma_P + p(x) \tag{1}$$

where S' represents measured speed of a frame, S represents the speed measured in a prior consecutive frame, $\sigma_P$ represents a predetermined standard deviation, and p(x) represents a probability density for a random Gaussian distribution.

The particle filter 330 determines trajectories of predicted motion for each individual particle based on motion detected between frames of the occupancy grid 512 using similar technique as described above in FIG. 5 with respect to predicting trajectories of predicted motion for object clusters. The predicted particle trajectories are then simulated against the cluster trajectory of the entire object cluster to determine if the particle motion is consistent relative to object cluster motion.

The particle filter 330 assigns a weight to each particle based on a consistency between the predicted particle trajectory and the predicted object cluster trajectory, which are included in particle weight data 604. For example, the particle filter 330 assigns a weight of "1.0" to particles that reside on a cell location occupied by a laser obstacle point in every frame of the occupancy grid 512, i.e., indicating that particle motion is generally consistent with object cluster motion. In an alternative example, the particle filter 330 assigns a weight of "0.0" to particles that does not reside in a cell occupied by a laser obstacle point in one or more frames of the occupancy grid 512, i.e., indicating that particle motion is not consistent with object cluster motion in such frames of the occupancy grid 512. In some implementations, the particle filter 330 assigns weights to individual particles in a binary fashion, i.e., assigning either a value of "1.0" or "0.0." In other implementations, the particle filter 330 assigns weights to individual particles based on a number of frames where the particle location is consistent with the location of the object cluster, i.e., assigning a range of values from "0.0" to "1.0" based on a determined degree of consistency.

The weights determined by the particle filter 330 can be used to approximate the belief distribution of the motion of an object cluster using the sampled particles and their respective weights, i.e., using particle weights to adjust the overall likelihood that a trajectory of a given object will be determined to collide with the vehicle, which is represented by an object cluster collision score. The object cluster collision score can be computed using equation 2:

$$P_c = \frac{\sum_j w_t^j \delta(x_t^j)}{\sum_j w_t^j} \tag{2}$$

where $P_C$ represents the object cluster collision score, j represents the total number of particles within an object cluster, t represents a time point associated with a frame of the occupancy grid 512, $w_t^j$ represents a weight assigned to a particle in a particular frame, and $\delta(x_t^j)$ represents a particle collision score associated to the particle.

The particle collision score, $\delta(x_t^j)$, represents a predicted likelihood that an individual particle sampled from within an object cluster will collide with the vehicle. This prediction is based on predicting particle motion based on determining a particle trajectory based on tracking particle motion within the frames of the occupancy grid. For example, the tracked motion of a particle during a time period corresponding the occupancy grid 512 is used to predict a location for the particle at some future time point. If this location coincides with a location where the vehicle will travel, then the particle will be determined to collide with the vehicle.

In the equation above, the object collision score, $P_C$, is computed as the sum of all weighted particle scores divided by the sum of all particle weights. To compute the sum of all weighted particle collision scores, the product of the particle weight, $w_t^j$ and the particle collision score, $\delta(x_t^j)$, is multiplied for each particle sampled from within an object cluster (represented with the label j) and within each frame of the occupancy grid 512 (represented with the label t). To compute the sum of all particle weights, each particle weight, $w_t^j$, assigned to each particle sampled within an object cluster and within each frame of the occupancy grid 512 is summed.

The particle filter 330 applies equation (2) to compute an object collision score for an object cluster that collectively represents a likelihood that the object cluster will collide into the vehicle based a combination of individual likelihoods of particles colliding into the vehicle and the consistency of particle motion and object cluster motion as described above. Because the particle filter 300 assigns particle weights to particles based on the consistency of particle motion with object cluster motion, as described above, the assigned weights can be used to remove or reduce the impact of particle collision scores of particles with inconsistent motion on the summation of all particle collision scores when computing the object collision score.

For example, if a first object cluster has a large number of particles that have been assigned a weight of "1.0," then the likelihood that its trajectory will be determined to collide with the vehicle will be greater than that of a second object cluster that has an identical trajectory but has a large number of particles that have been assigned a weight of "0.0." This example illustrates how the system applies the particle weights to adjust collision detection for a given object cluster based on the consistency between object cluster motion and particle motion.

In the example depicted in FIG. 6, the particle filter 330 selects four particles P01-04 that occupy object cluster C03 within the occupancy grid 512. The particle filter 330 tracks the location of each particle within each frame of the occupancy grid 512, as described above, to generate particle data 602. The particle data 602 identifies the coordinate locations of each selected particle within each frame of the occupancy grid 512. The particle filter 330 then determines particle motion trajectories for each of the particles P01-04 based on their specified locations within each frame as indicated within the particle data 602. Each particle trajectory is simulated with the cluster trajectory indicated within the object cluster data 514 to determine consistency between individual particle motion within the occupancy grid 512 and object cluster motion within the occupancy grid 512.

As shown, in the example, the particle filter 330 assigns a weight of "1.0" to particle P01, a weight of "0.4" to particle P03, and a weight of P03 "0.0" to particles P02 and P04. In this example, the particle motion for particle P01 is determined to be entirely consistent with cluster motion of the object cluster C03, the particle motion for particle P03 is determined to be somewhat consistent, i.e., discrepancies in locations in one or more frames of the occupancy grid 512, and the particle motion for particles P02 and P04 are not consistent, i.e., discrepancies in a majority of frames of the occupancy grid 512. Because particles P02 and P04 are assigned weights of "0.0," trajectories of motion detected for these particles are not factored into any adjustments to the predicted motion of the object cluster C03 as a whole for use in collision detection.

Figure 7:
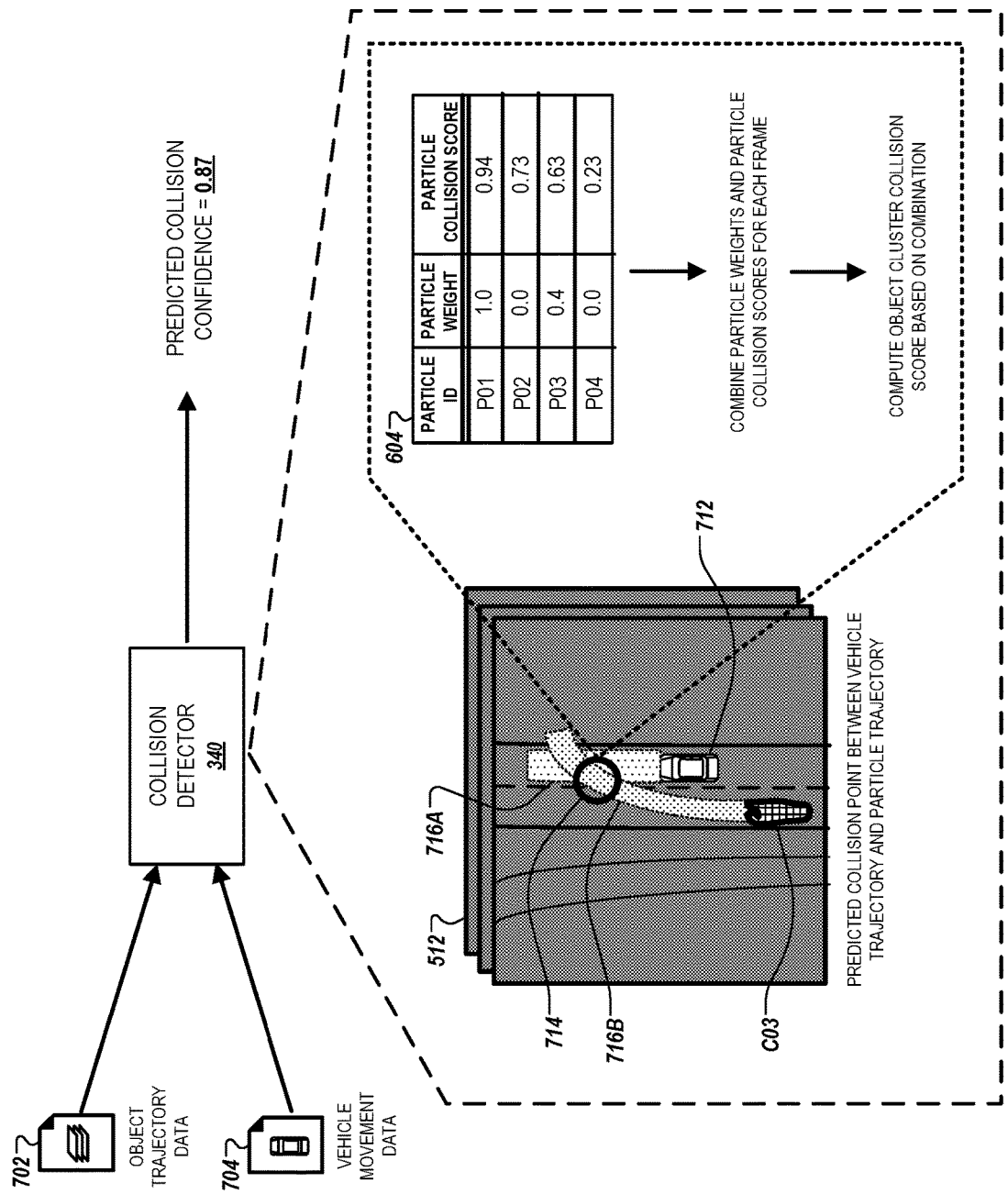
FIG. 7 is a schematic diagram of an example of a process for predicting a potential collision with an object detected in the vicinity of a vehicle.

Referring to FIG. 7, an example of a process for predicting a collision between a vehicle and any objects within a vicinity of the vehicle is depicted. The collision detector 340 initially obtains object trajectory data 702 generated by the particle filter 330, and vehicle movement data 704 representing a vehicle trajectory 716A based on present vehicle motion. The collision detector 340 computes a predicted collision score representing an overall likelihood that any object clusters specified within the object trajectory data 702 will collide with a vehicle trajectory 716A. This likelihood can be determined based on determining whether a predicted future location of any of object clusters falls within the vehicle trajectory 716A. In computing the predicted collision confidence, the collision detector 340 also computes an object collision score for each individual object cluster and a particle collision score for each individual particle sampled from within each object cluster.

The collision detector 340 computes the particle collision scores based on determining respective likelihoods that particles sampled from within object clusters specified within the object trajectory data 702 will collide with the vehicle as it travels along the vehicle trajectory 716A as described above with respect to FIG. 6. The collision detector 240 computes the object collision score by combining the particle weights and particle collision scores for all particles that are sampled from within a given object cluster by applying equation (2) described above.

In the example depicted in FIG. 7, the collision detector 340 computes an object collision score for the object cluster C03 based on combining the respective particle weights and particle collision scores for particles P01-04 which were sampled by the particle filter 330 from the object cluster C03 as discussed above. The collision detector 340 applies the respective particle weights to each of the corresponding particle collision scores and then sums weighted product across all particles and across all frames of the occupancy grid 512 to compute the object collision score. In this example, the particle collision scores for the particles P02 and P04, as specified within the particle weight data 604, do not contribute to the object cluster collision score because their particle weights are assigned a value of "0.0" due to particle motion not being consistent with object cluster motion within the occupancy grid 512 ad described above with respect to FIG. 6.

The collision detector 340 also computes the predicted collision confidence for all objects within the vicinity of the vehicle 712 based on the object cluster collision scores computed for corresponding object clusters within the occupancy grid 512 that are vicinity of the vehicle 712. As an example, if there are three object clusters that are identified within the occupancy grid 512 and for which object cluster collision scores have been computed, then the predicted collision confidence is computed based on combining and/or evaluating these object cluster collision scores.

The collision detector 340 may use various evaluation techniques in computing the predicted collision confidence. In some implementations, the collision detector 340 computes the predicted collision confidence based on determining the average value of all object cluster collision scores for object clusters identified within the occupancy grid 512. In other implementations, the collision detector 340 computes the predicted collision confidence based on the number of object clusters that are determined to have an object cluster collision score that exceeds a predetermined threshold value. In such implementations, the collision detector 340 may provide a collision alert, i.e., publishing an alert to a driver of the vehicle 712 that there is a high likelihood that vehicle 712 will collide into at least one nearby object corresponding to an object cluster near the vicinity of the vehicle 712 within the occupancy grid 512. In some other implementations, the predicted collision confidence can also be represented as the highest object cluster collision score that is determined for the object clusters that are within the vicinity of the vehicle 712.

In some implementations where the system does not perform clustering, the collision detector 340 determines the predicted collision confidence based on combining the particle collision scores as a substitute to the object cluster collision scores, i.e., combining the particle collision scores to compute the collision confidence score without computing the object cluster collision scores. In such implementations, the particle filter 330 computes particle weights based on the consistency of particle motion between consecutive frames of the occupancy grid 512. The collision detector 340 then applies the determined particle weights to the corresponding particle collision scores and combines the weighed particle collision scores to determine the predicted collision confidence. Alternatively, the collision detector 340 may determine the predicted collision confidence based on number of particles that are determined to have particle collision scores that satisfy a predetermined threshold value.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   obtaining, by a computer system on-board a vehicle, laser obstacle points derived from recent sensor readings of one or more sensors of the vehicle;
   obtaining, by the computer system on-board the vehicle, vehicle movement data representing a vehicle trajectory of the vehicle;
   projecting, by the computer system on-board the vehicle, the laser obstacle points into a pose coordinate system to generate an occupancy grid of a vicinity of the vehicle, wherein the occupancy grid comprises multiple frames, and wherein each of the multiple frames comprises a plurality of laser obstacle points;
   clustering, by the computer system on-board the vehicle, the projected laser obstacle points in the occupancy grid into one or more object clusters that each represents one or more corresponding objects;
   generating, by the computer system on-board the vehicle and for each object cluster, an object trajectory from movement of the object cluster within the multiple frames of the occupancy grid;
   for each object cluster:
      assigning, by the computer system on-board the vehicle and using particle filtering, a respective weight to each of a plurality of individual particles that are sampled from within the object cluster based on correspondences between the trajectories of the individual particles that are sampled from within the object cluster and the object trajectories of the object clusters;
      determining, by the computer system on-board the vehicle, a respective particle collision score for each of the plurality of individual particles from the object cluster that represents a likelihood that the trajectory of the individual particle will collide with the vehicle trajectory of the vehicle at a future time point; and
      determining, by the computer system on-board the vehicle, a cluster collision score for the object cluster based on the respective weights and respective particle collision score for the individual particles from the cluster; and
   determining, by the computer system on-board the vehicle and from the cluster collision scores, a confidence that any objects represented by the laser obstacle points are on a trajectory that will collide with the vehicle at the future time point.

2. The method of claim 1, further comprising:
   when the confidence exceeds a threshold confidence, providing a collision alert to a control system for the vehicle.

3. The method of claim 1, wherein:
   the sensor readings are collected over a particular time period; and
   wherein the multiple frames of the occupancy grid each correspond to a different time point within the particular time period.

4. The method of claim 1, wherein generating, for each object cluster, an object trajectory from movement of the object cluster within the multiple frames of the occupancy grid comprises:
   determining a respective coordinate location of the object cluster within each of the multiple frames of the occupancy grid; and
   determining a respective object trajectory for the object cluster based on the determined respective locations of the object cluster within each of the multiple frames of the occupancy grid.

5. The method of claim 1, wherein clustering the projected laser obstacle points in the occupancy grid into one or more object clusters that each represents one or more corresponding objects comprises:
   clustering the laser obstacle points into one or more candidate object clusters; and
   discarding any candidate object clusters having a size that does not satisfy predetermined size criteria.

6. The method of claim 1, wherein assigning, using particle filtering, a respective weight to each of a plurality of individual particles that are sampled from within the object cluster based on correspondences between the trajectories of the individual particles that are sampled from within the object cluster and the object trajectories of the object clusters comprises:
   determining a plurality of particles that are within the vicinity of the vehicle in the occupancy grid;
   for each of the plurality of particles:
      determining a location of the particle within each of the multiple frames of the occupancy grid;
      determining a particle trajectory based on the determined locations of the particle within each of the multiple frames of the occupancy grid; and
      assigning a weight to the particle based on a correspondence between the particle trajectory and an object trajectory of an object cluster that includes the particle.

7. The method of claim 6, wherein assigning, using particle filtering, a respective weight to each of a plurality of individual particles that are sampled from within the object cluster based on correspondences between the trajectories of the individual particles that are sampled from within the object cluster and the object trajectories of the object clusters further comprises, for each of the one or more object clusters:
   combining the particle trajectories using the respective weights assigned to the particles included in the object cluster to generate one or more combined particle trajectories.

8. A system comprising:
   one or more computers; and
   one or more storage devices storing instructions that, when executed by the one or more computers, cause the one or more computers to perform operations comprising:
      obtaining laser obstacle points derived from recent sensor readings of one or more sensors of a vehicle;
      obtaining vehicle movement data representing a vehicle trajectory of the vehicle;
      projecting the laser obstacle points into a pose coordinate system to generate an occupancy grid of a vicinity of the vehicle, wherein the occupancy grid comprises multiple frames, and wherein each of the multiple frames comprises a plurality of laser obstacle points;

clustering the projected laser obstacle points in the occupancy grid into one or more object clusters that each represents one or more corresponding objects;

generating, for each object cluster, an object trajectory from movement of the object cluster within the multiple frames of the occupancy grid;

for each object cluster:
assigning, using particle filtering, a respective weight to each of a plurality of individual particles that are sampled from within the object cluster based on correspondences between the trajectories of the individual particles that are sampled from within the object cluster and the object trajectories of the object clusters;

determining a respective particle collision score for each of the plurality of individual particles from the object cluster that represents a likelihood that the trajectory of the individual particle will collide with the vehicle trajectory of the vehicle at a future time point; and determining a cluster collision score for the cluster based on the respective weights and respective particle collision score for the individual particles from the cluster; and determining, from the cluster collision scores, a confidence that any objects represented by the laser obstacle points are on a trajectory that will collide with the vehicle at the future time point.

9. The system of claim 8, wherein the operations further comprise:
when the confidence exceeds a threshold confidence, providing a collision alert to a control system for the vehicle.

10. The system of claim 8, wherein:
the sensor readings are collected over a particular time period; and
wherein the multiple frames of the occupancy grid each correspond to a different time point within the particular time period.

11. The system of claim 8, wherein the operations of generating, for each object cluster, an object trajectory from movement of the object cluster within the multiple frames of occupancy grid comprise:
determining a respective coordinate location of the object cluster within each of the multiple frames of the occupancy grid; and
determining a respective object trajectory based on the determined respective locations of the object cluster within each of the multiple frames of the occupancy grid.

12. The system of claim 8, wherein the operations of assigning, using particle filtering, a respective weight to each of a plurality of individual particles that are sampled from within the object cluster based on correspondences between the trajectories of the individual particles that are sampled from within the object cluster and the object trajectories of the object clusters comprises:
determining a plurality of particles that are included in each of the one or more object clusters; and
for each of the plurality of particles:
determining a location of the particle within each of the multiple frames of the occupancy grid;
determining a particle trajectory based on the determined locations of the particle within each of the multiple frames of the occupancy grid; and assigning a weight to the particle based on a correspondence between the particle trajectory and an object trajectory of an object cluster that includes the particle.

13. A non-transitory computer-readable storage device encoded with computer program instructions that, when executed by one or more computers, cause the one or more computers to perform operations comprising:
obtaining laser obstacle points derived from recent sensor readings of one or more sensors of a vehicle;
obtaining vehicle movement data representing a vehicle trajectory of the vehicle;
projecting the laser obstacle points into a pose coordinate system to generate an occupancy grid of a vicinity of the vehicle, wherein the occupancy grid comprises multiple frames, and wherein each of the multiple frames comprises a plurality of laser obstacle points;
clustering the projected laser obstacle points in the occupancy grid into one or more object clusters that each represents one or more corresponding objects;
generating, for each object cluster, an object trajectory from movement of the object cluster within the multiple frames of the occupancy grid;
for each cluster:
assigning, using particle filtering, a respective weight to each of a plurality of individual particles that are sampled from within the object cluster based on correspondences between the trajectories of the individual particles that are sampled from within the object cluster and the object trajectories of the object clusters;

determining a respective particle collision score for each of the plurality of individual particles from the object cluster that represents a likelihood that the trajectory of the individual particle will collide with the vehicle trajectory of the vehicle at a future time point; and determining a cluster collision score for the cluster based on the respective weights and respective particle collision score for the individual particles from the cluster; and determining, from the cluster collision scores, a confidence that any objects represented by the laser obstacle points are on a trajectory that will collide with the vehicle at the future time point.

14. The device of claim 13, wherein the operations further comprise:
when the confidence exceeds a threshold confidence, providing a collision alert to a control system for the vehicle.

15. The device of claim 13, wherein:
the sensor readings are collected over a particular time period; and
wherein the multiple frames of the occupancy grid each correspond to a different time point within the particular time period.

16. The device of claim 13, wherein the operations of generating, for each object cluster, an object trajectory from movement of the object cluster within the multiple frames of occupancy grid comprise:
determining a respective coordinate location of the object cluster within each of the multiple frames of the occupancy grid; and
determining a respective object trajectory based on the determined respective locations of the object cluster within each of the multiple frames of the occupancy grid.

* * * * *